US009161371B2

(12) United States Patent
Ehsan et al.

(10) Patent No.: US 9,161,371 B2
(45) Date of Patent: Oct. 13, 2015

(54) POWER OPTIMIZATION USING SCHEDULING REQUEST DELAY

(75) Inventors: Navid Ehsan, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/552,455

(22) Filed: Jul. 18, 2012

(65) Prior Publication Data

US 2013/0021995 A1 Jan. 24, 2013

Related U.S. Application Data

(60) Provisional application No. 61/510,389, filed on Jul. 21, 2011.

(51) Int. Cl.
*H04W 72/04* (2009.01)
*H04W 72/12* (2009.01)
*H04W 76/04* (2009.01)
*H04W 52/02* (2009.01)

(52) U.S. Cl.
CPC ...... *H04W 72/1284* (2013.01); *H04W 52/0216* (2013.01); *H04W 76/048* (2013.01); *Y02B 60/50* (2013.01)

(58) Field of Classification Search
None
See application file for complete search history.

(56) References Cited

U.S. PATENT DOCUMENTS

2009/0046627 A1* 2/2009 Xu ................................ 370/328
2009/0161620 A1* 6/2009 Cai et al. ....................... 370/329
2009/0232118 A1* 9/2009 Wang et al. ................... 370/338
2009/0239568 A1* 9/2009 Bertrand et al. .............. 455/522
2009/0247203 A1* 10/2009 Kuo ............................. 455/509
2010/0087200 A1* 4/2010 Ishii et al. ..................... 455/450
2010/0260121 A1* 10/2010 Gholmieh et al. ............ 370/329
2011/0002281 A1* 1/2011 Terry et al. .................... 370/329
2011/0026625 A1* 2/2011 Susitaival et al. ............ 375/260
2011/0032924 A1* 2/2011 Lee et al. ...................... 370/345

(Continued)

FOREIGN PATENT DOCUMENTS

JP 2005260906 A 9/2005
JP 2007235871 A 9/2007

(Continued)

OTHER PUBLICATIONS

Rosa, Jul. 4, 2011, WIPO, WO2011038775, Whole Document.*
Rosa Jul. 2011, WIPO, WO2011038775, Whole Document.*
International Search Report and Written Opinion—PCT/US2012/047449—ISA/EPO—Jan. 25, 2013.

*Primary Examiner* — Ian N Moore
*Assistant Examiner* — Lakeram Jangbahadur
(74) *Attorney, Agent, or Firm* — Patterson & Sheridan, LLP

(57) ABSTRACT

Certain aspects of the disclosure relate generally to techniques for managing scheduling requests (SRs) for resources for uplink transmission. For example, certain aspects of the present disclosure relate to a method for wireless communication including determining a transmit opportunity for transmitting SR for uplink resources based, at least in part, on a discontinuous reception (DRX) time cycle. According to certain aspects, a user equipment (UE) may delay transmitting the SR based on the DRX time cycle to prevent repeated interruption of the DRX cycle that may reduce benefits of the power-saving DRX scheme.

16 Claims, 6 Drawing Sheets

700

702 SELECT VALUE FOR A CONFIGURABLE TIMER $t_{SR}$ FOR DELAYING TRANSMITTING SR BASED ON CHANNEL CONDITIONS (e.g., $t_{SR} = t_{SR\_1}$ if channel is "good" or $t_{SR} = t_{SR\_2}$ if channel is "bad)

704 FIND TIME $t_{SEND\_SR}$ FOR FIRST SR TX OPPORTUNITY AFTER $t_{CURRENT} + t_{SR}$

706 $t_{SEND\_SR} - t_{CURRENT} > t_{THRESHOLD}$ ?

NO

710 CHOOSE PREVIOUS SR TX OPP

YES

708 CHOOSE SR TX OPP AT $t_{SEND\_SR}$

(56) References Cited

U.S. PATENT DOCUMENTS

| | | | | |
|---|---|---|---|---|
| 2011/0158188 | A1* | 6/2011 | Womack et al. | 370/329 |
| 2012/0044848 | A1* | 2/2012 | Womack et al. | 370/311 |
| 2012/0113878 | A1* | 5/2012 | Yu et al. | 370/311 |
| 2012/0115471 | A1* | 5/2012 | Awoniyi et al. | 455/435.1 |
| 2012/0201180 | A1* | 8/2012 | Cai et al. | 370/311 |
| 2012/0233481 | A1* | 9/2012 | Henttonen et al. | 713/323 |
| 2013/0012206 | A1* | 1/2013 | Kitazoe | 455/435.1 |
| 2013/0021995 | A1* | 1/2013 | Ehsan et al. | 370/329 |

FOREIGN PATENT DOCUMENTS

| | | | |
|---|---|---|---|
| JP | 2011514723 | A | 5/2011 |
| WO | 2009099931 | A1 | 8/2009 |
| WO | 2011038775 | A1 | 4/2011 |

* cited by examiner

POWER OPTIMIZATION USING SCHEDULING REQUEST DELAY

CLAIM OF PRIORITY UNDER 35 U.S.C. §119

The present application for patent claims benefit of U.S. Provisional Patent Application Ser. No. 61/510,389, filed Jul. 21, 2011, and hereby expressly incorporated by reference herein.

FIELD

Certain aspects of the disclosure relate generally to wireless communications systems and, more particularly, to methods and apparatus for managing a scheduling request process for power optimization.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

A user equipment (UE) may utilize one or more power saving and/or power optimization schemes, such as Discontinuous Transmission (DTX) or Discontinuous Reception (DRX). When such schemes are enabled, the UE may shut down and/or disable transreceiver components for pre-configured periods of time, thus conserving energy and lengthening battery life of the UE. However, the UE may have unexpected transmissions that may interrupt the power saving schemes (e.g., DRX) and reduce effectiveness of the power saving schemes. As such, there is a need for techniques and apparatus for coordinating transmissions with the power saving schemes.

SUMMARY

Certain aspects of the present disclosure provide a method for wireless communications. The method generally includes determining a transmit opportunity for transmitting a scheduling request (SR) for uplink resources based, at least in part, on a discontinuous reception (DRX) time cycle, and transmitting the SR in the determined transmit opportunity.

Certain aspects of the present disclosure provide an apparatus for wireless communication. The apparatus generally includes means for determining a transmit opportunity for transmitting a scheduling request (SR) for uplink resources based, at least in part, on a discontinuous reception (DRX) time cycle. The apparatus further includes means for transmitting the SR in the determined transmit opportunity.

Certain aspects of the present disclosure provide a computer program product, comprising a computer-readable medium. The computer-readable medium generally includes code for determining a transmit opportunity for transmitting a scheduling request (SR) for uplink resources based, at least in part, on a discontinuous reception (DRX) time cycle, and transmitting the SR in the determined transmit opportunity.

Certain aspects of the present disclosure provide an apparatus for wireless communication, comprising at least one processor and a memory coupled to the at least one processor. The at least one processor is generally configured to determine a transmit opportunity for transmitting a scheduling request (SR) for uplink resources based, at least in part, on a discontinuous reception (DRX) time cycle, and transmit the SR in the determined transmit opportunity.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
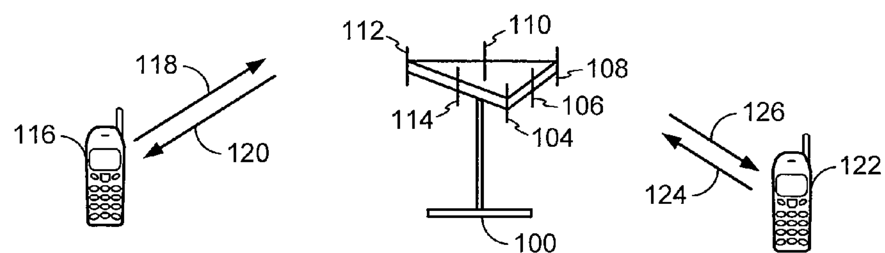
FIG. 1 illustrates a multiple access wireless communication system.

In some cases, a user equipment (UE) may utilize dynamic scheduling in order to receive grants for uplink resources. According to certain aspects of the present disclosure, the UE may transmit a scheduling request (SR) to a base station to request for uplink (UL) grants when the UE does not currently have any granted resources allocated to the UE. Upon receiving new data and/or packets from upper layers, the UE may have to wait for a pre-determined periodic time interval for transmitting SR (i.e., a SR "opportunity"), or, in the alternative, perform a random access procedure to gain access to uplink resources.

Generally, the UE may send the SR at the first available SR opportunity after the new data arrival in order to minimize delay of communications. However, this may cause significant inefficiency in terms of network resources and/or power consumption, particularly in cases where power-saving modes are enabled, such as DRX. For example, if a UE exits DRX immediately to send the SR, overall power savings achieved by the DRX may be reduced. Even if the UE re-enters the power savings mode after sending the SR, frequent switching on and off of components may result in more power consumption than if DRX were not enabled at all.

Therefore, according to certain aspects, the UE may determine an optimized time to transmit the SR in situations where the UE may have a power-saving mode, such as DRX, enabled. As will be described in greater detail below, the UE may determine whether to send the SR immediately at the next available SR opportunity or whether the UE should wait at least until the end of a given DRX time cycle.

According to certain aspects, the UE may determine a transmit opportunity for SR based on several factors, including, but not limited to, delay requirements for a particular bearer with new packet arrivals, length of DRX cycles, channel conditions, and/or SR periodicity. Certain aspects of the present disclosure provide techniques to control the SR process that minimize "rude wake-ups" during a connected mode DRX. Certain aspects of the present disclosure may advantageously maximize power-saving benefits of DRX off cycles and significantly reduce power consumption.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access schemes in 3GPP Long Term Evolution (LTE), or Evolved UTRA, and/or LTE Advanced.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an wireless terminal, a user terminal, a user agent, a user device, user equipment ("UE"), a user station, a subscriber station, a subscriber unit, a mobile station, a remote station, a remote terminal, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects described herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. Each antenna group may be designed to communicate to access terminals in a sector of the areas covered by access point 100. In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
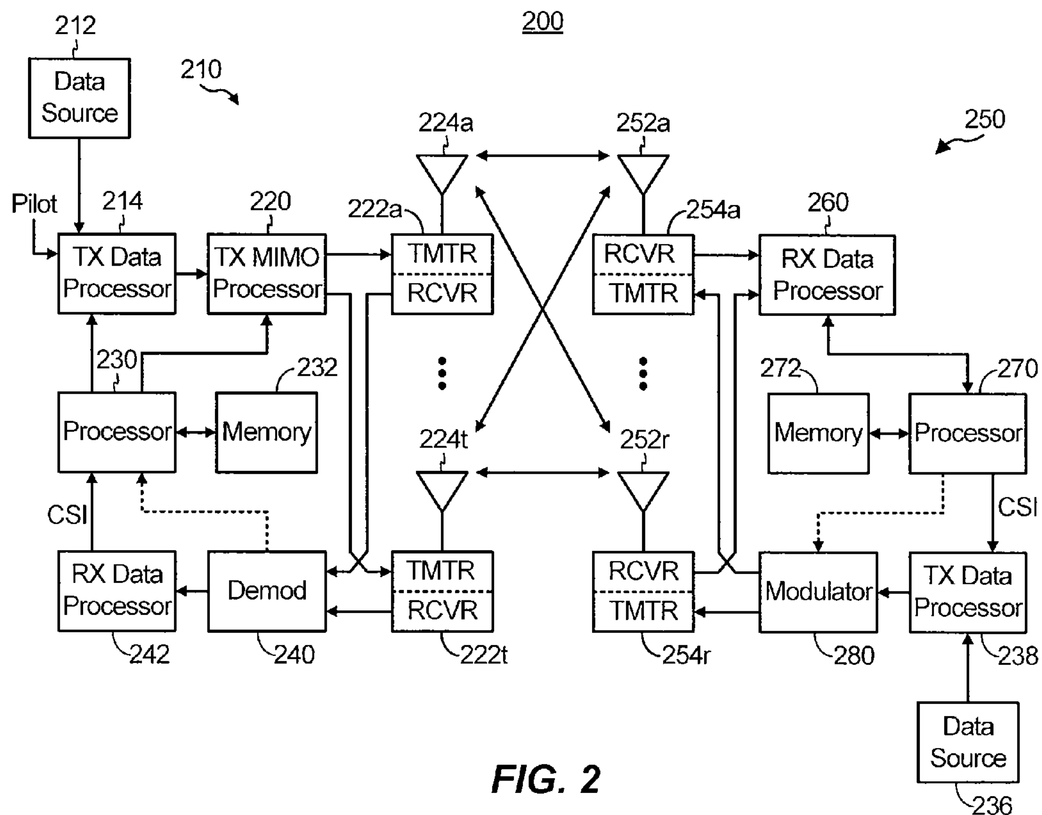
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

According to certain aspects, the receiver system 250 may be configured to implement a power-saving scheme, such as DTX or DRX. To reduce power consumption, the receiver system 250 may be configured to disable or shut-off one or more components, including, but not limited to, the $N_R$ antennas 252*a* through 252*r*, the receivers 254*a* through 254*r*, and the RX data processor 260. According to certain aspects, the processor 270 may determine the one or more components to turn off for at least a portion of a periodic time interval, referred sometimes as a DRX time cycle or a DRX cycle.

According to certain aspects, the TX data processor 238 receives traffic data from the data source 236 for uplink transmission to the transmitter system 210. The TX data processor 238 may signal to the processor 270 to indicate the receipt of the traffic data, for example, as a new packet arrival. According to certain aspects, responsive to a new packet arrival, the processor 270 may determine and/or select a time interval comprising an SR opportunity for transmission of SR to request uplink grants from the transmitter system 210. The processor 270 may be configured to determine the SR opportunity for SR transmission based on the DRX time cycle, such that the SR transmission does not interfere with the power-saving efficiency of the DRX scheme, in accordance with certain aspects described in further detail below.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

It is generally understood that logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

It is further understood that Transport Channels are classified into DL and UL. DL Transport Channels comprise a Broadcast Channel (BCH), a Downlink Shared Data Channel (DL-SDCH) and a Paging Channel (PCH), the PCH for support of UE power saving (Discontinuous Reception (DRX) cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:

Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:

Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

For the purposes of the present document, the following abbreviations apply:

ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C- Control-
CB Contention-Based
CCE Control Channel Element
CCCH Common Control CHannel
CCH Control CHannel
CCTrCH Coded Composite Transport CHannel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DS Dedicated Reference Signal
DSCH Downlink Shared CHannel
DSP Digital Signal Processor
DTCH Dedicated Traffic CHannel
E-CID Enhanced Cell IDentification
EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control CHannel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access CHannel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator
RNTI Radio Network Temporary Identifier
RS Reference Signal
RTT Round Trip Time
Rx Receive
SAP Service Access Point
SDU Service Data Unit
SFBC Space Frequency Block Code
SHCCH SHared channel Control CHannel
SNR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper Field
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
TX Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol MBSFN multicast broadcast single frequency network
MCH multicast channel
DL-SCH downlink shared channel
PDCCH physical downlink control channel
PDSCH physical downlink shared channel Power Optimization Using Scheduling Request Delay Certain aspects of the present disclosure provide techniques for DRX power saving operations. According to certain aspects, a UE may determine a transmit opportunity for transmitting a scheduling request (SR) for uplink resources based, at least in part, on a discontinuous reception (DRX) time cycle.

As will be described in greater detail below, if performance parameters for a given application (e.g., a voice call) can be met without exiting DRX, the UE may wait and send the SR in a transmit opportunity after exiting DRX. On the other hand, the UE may choose an earlier transmit opportunity (during a scheduled DRX off cycle) if it determines the performance parameters will not be met if waiting. According to certain aspects, the determination may be based on a configurable timer with values determined based on channel quality.

As described above, the UE may turn off one or more components during a time interval (i.e., the DRX off cycle) utilized by the UE for a low power mode. As different components may have different power-off times, exactly which hardware components are switched off during DRX off cycles may depend on the estimated length of the off cycle (which may be referred to as a $t_{sleep}$ parameter).

For example, according to certain aspects, for a shortest "off" duration defined as less than a time $T_1$ (e.g., $t_{sleep}<T_1$), no components may be turned off. For a duration of time defined between the time $T_1$ and a time $T_2$ (e.g., $T_1<t_{sleep}<T_2$), only a single component or component(s) X (e.g., an RF chain) may be turned off. As $t_{sleep}$ increases, additional components may also be turned off until, above a certain duration, most components may be powered down (a deep sleep). In some cases, the different time thresholds may be determined based on a particular modem architecture and/or specification.

Figure 3:
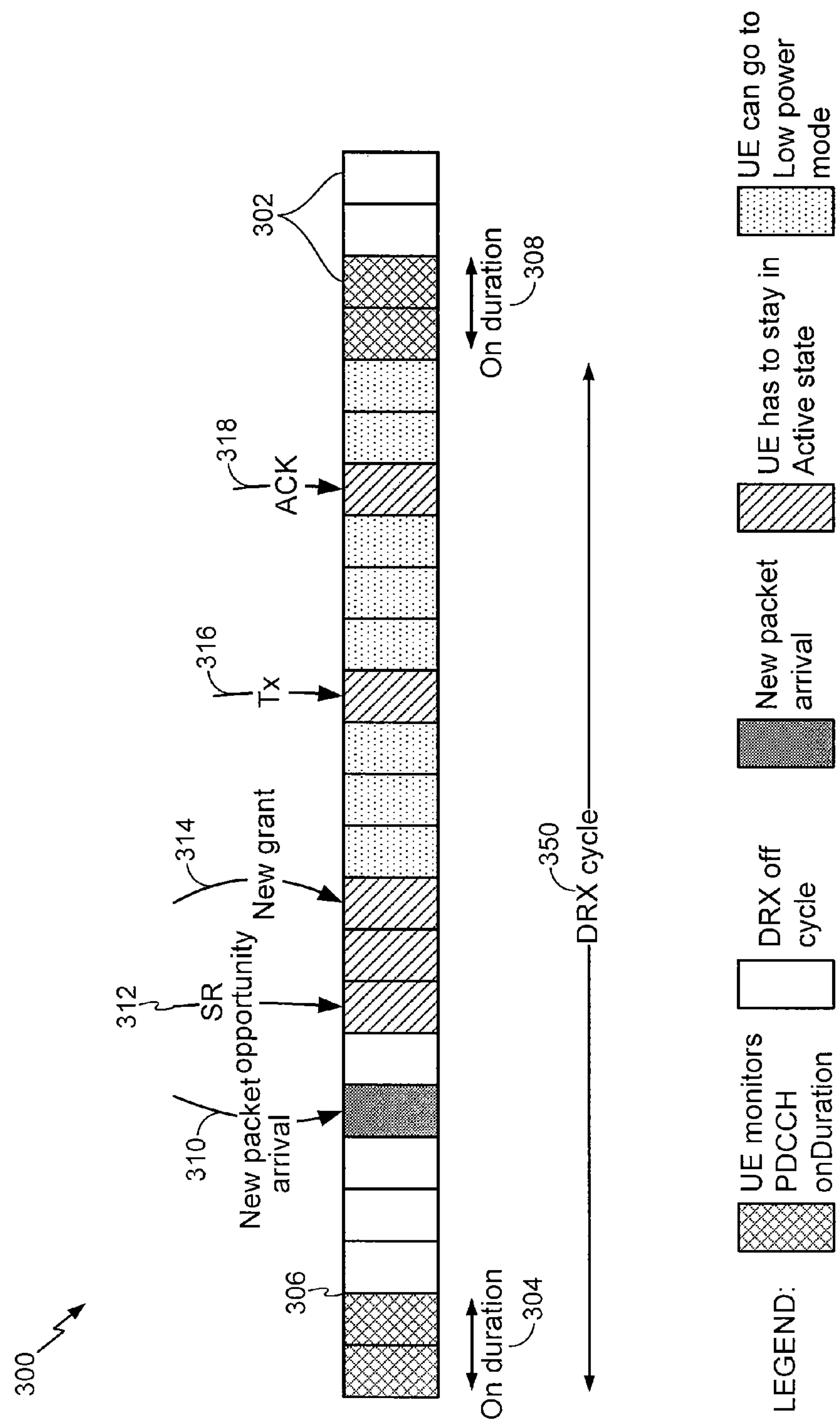
FIG. 3 illustrates an example of scheduling request (SR) transmit opportunities relative to a DRX cycle, in accordance with certain aspects of the present disclosure.

FIG. 3 illustrates an example frame 300 that may help illustrate how SR scheduling can affect the power efficiency gained from DRX by a UE. As illustrated, the time frame 300 is formed by a plurality of transmit time intervals 302 (TTIs).

As illustrated, the UE may utilize a power saving DRX scheme comprising a periodic DRX cycle 350. As shown, the UE may be in an active state comprising active transmission and/or reception for a periodic duration of time (e.g., on Duration 304), wherein one or more components of the UE may be powered on and are being utilized. According to certain aspects, the UE may utilize a timer to track the duration of time 304 (e.g., an on Duration timer). As illustrated, the UE may monitor Physical Downlink Control Channel (PDCCH) for transmissions addressed to the UE.

Upon expiry of the on Duration timer at 306, the UE may power off one or more components. According to certain aspects, the next estimated wake up time may typically be the next on Duration time 308. As such, in one particular example, assuming the DRX cycle 350 comprises a 20 msec periodicity, the UE may begin to power down a radio transceiver component.

As shown, at 310, a new packet may arrive after the on Duration period 304 is over, in this example, just four TTIs after the end on Duration period. In response to detecting the new packet to transmit, the UE may seek to transmit an SR to request an uplink grant for resources to transmit the new packet. However, at the time of the new packet arrival, the UE has powered down or is in the process of powering down.

As illustrated, an SR opportunity 312 occurs two TTIs after UE has received the new packet (i.e., six TTIs after the end of the last on Duration 304). It can be seen that if the UE tries to use the SR opportunity 312 to send the SR, the UE may have to remain in an active mode for the rest of the DRX cycle 350. For example, as shown at 314, the UE may receive a new uplink grant to transmit the new data packet utilizing uplink resources at a later time interval, depicted as TX TTI 316. The UE may then wait for an acknowledgement of the transmission, shown at 318.

Thus, in this example, because the UE exited the DRX cycle to transmit an SR at the first available SR TX Opportunity 312, the majority of the DRX cycle was spent in an active state and not powered down. A much more power efficient technique is provided herein, that may take advantage of knowledge of the pattern at which data packets arrive in certain applications.

For example, in Voice over IP applications, it may be expected that data packets arrive exactly 20 ms apart and that this pattern will repeat. As such, if the first SR opportunity were always used, the DRX cycle would be repeatedly interrupted and the power efficiency gain from DRX may be minimal. As noted above, the UE may even experience higher power consumption compared to instances not utilizing DRX at all due to the penalty in turning components on and off too frequently.

Techniques presented herein, however, provide for techniques that may be used to save power by intelligently selecting SR opportunities when operating in a discontinuous reception mode with dynamic scheduling. Certain aspects of the present disclosure provide power optimization during uplink traffic by controlling scheduling request delay, particularly during Voice over IP (VoIP) communications over LTE. As will be described in greater detail below, in some cases, performance requirements may still be met while delaying to select SR opportunities that occur after the end of a DRX cycle off period-when the UE is already in active mode. As a result, the UE does not need to prematurely exit the DRX off period and the loss of DRX power savings may be avoided.

Figure 4:
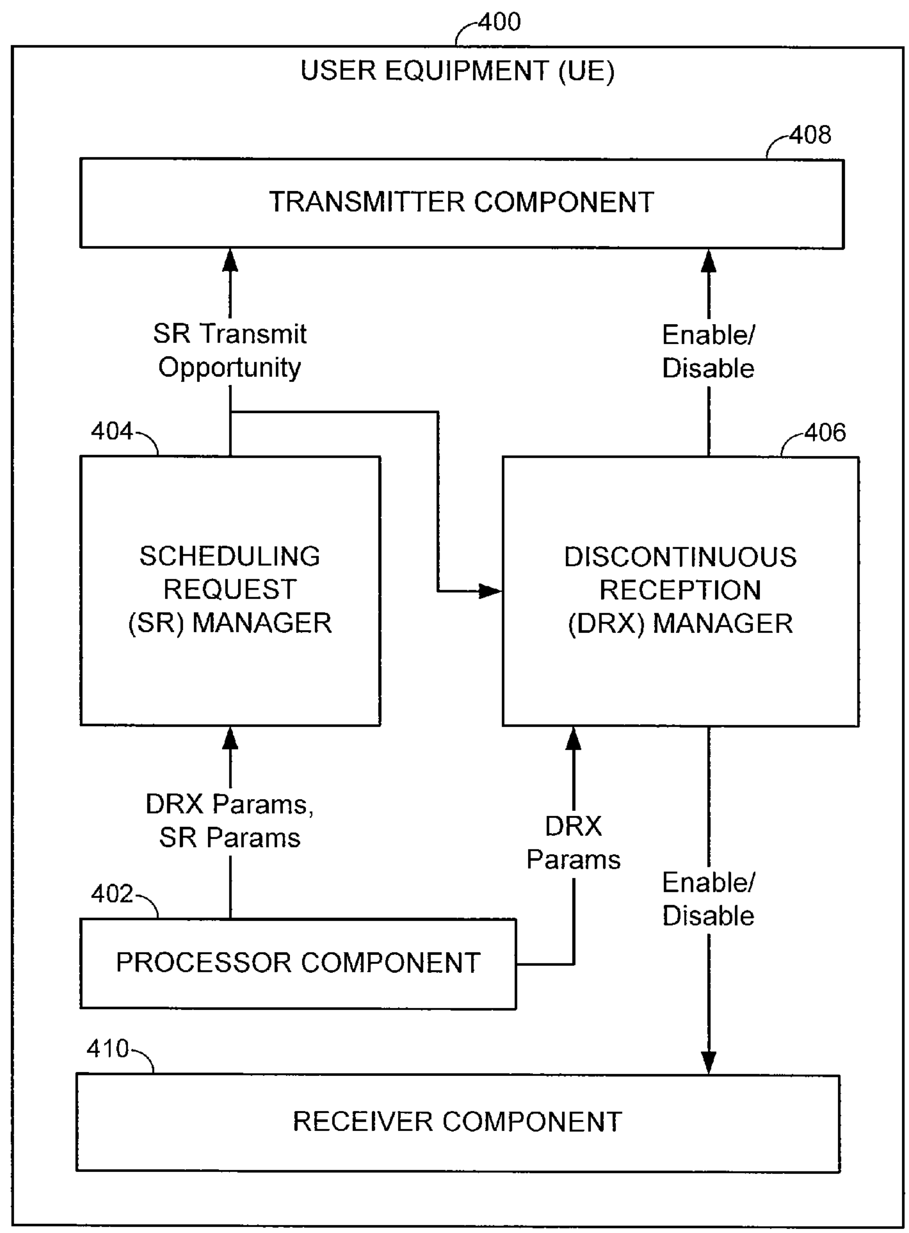
FIG. 4 illustrates various components that may be utilized in a wireless device in accordance with certain aspects of the present disclosure.

FIG. 4 illustrates various components that may be utilized in a wireless device 400 that may be employed within the wireless communication system illustrated in FIG. 1. The wireless device 400 is an example of a device that may be configured to implement the various methods described herein for managing scheduling requests for power optimization.

While the wireless device 400 may be any of user terminals 116 and 122 of FIG. 1 or the receiver system 250 of FIG. 2, the below detailed description may interchangeably refer to the wireless device 400 as a UE 400.

As shown, the UE 400 includes a processor component 402 that provides one or more DRX parameters and/or SR parameters to a scheduling request (SR) manager 404. According to certain aspects, the processor component 402 may provide an indication to the SR manager 404 that a new data packet has arrived for uplink transmission.

According to certain aspects, the SR manager 404 may be configured to decide when to send SR (shown as "SR Transmit Opportunity"). According to certain aspects, the SR manager 404 determines a transmit opportunity for transmitting a SR for uplink resources based, at least in part, on a DRX time cycle. According to certain aspects, the SR manager 404 determines a transmit opportunity based, at least in part, on the one or more DRX parameters (e.g., defining the DRX time cycle and periodicity) and/or the one or more SR parameters.

As shown, according to certain aspects, the SR manager 404 provides the determined SR transmit opportunity to a transmitter component 408 to transmit SR during the determined SR transmit opportunity to a base station (not shown) to request UL grants. Additionally, as shown, the SR manager 404 provides the determined SR transmit opportunity to a discontinuous reception (DRX) manager 406.

According to certain aspects, the DRX manager 406 may be configured to determine one or more components to turn off for a pre-configured duration of time (sometimes referred to as "off cycle" or "down cycle") to conserve battery life and reduce power consumption. The DRX manager 406 may signal to one or more components of the wireless device 400 to enable and/or disable the components for the determined duration of time. For example, as shown in FIG. 4, the DRX manager 406 may signal to the transmitter component 408 and a receiver component 410 to enable and/or disable the components. It is contemplated that the DRX manager 406 may enable and/or disable additionally other components of the wireless device 400.

According to certain aspects, the DRX manager 406 may be configured to determine one or more components to power off based on, at least in part, on DRX parameters received, for example, from the processor component 402. According to certain aspects, the DRX manager 406 may be configured to disable components when DRX is triggered (for example, via a system frame number (SFN)). According to certain aspects, the different components may have different power-cycle times, and as such, certain hardware components may be switched off during DRX off cycles, depending on the estimated length of the off cycle.

As described above, exactly which components are powered off during DRX off cycles may depend on the off duration. Example components that may be powered off include radio transceiver (transmitted and/or receiver) components, a mobile data modem (MDM) component, and/or a modem processor (e.g. a processor configured for software and firmware). For long durations, in an extreme low power state (deep sleep), most all components may be turned off except for core components and/or clock components (e.g., temperature-compensated crystal oscillator or "TCXO").

According to certain aspects, the DRX manager 406 may receive an indication from the SR manager 404 of a determined SR transmit opportunity. Responsive to receiving the determined SR transmit opportunity to be used next, the DRX manager 406 may be configured to prepared to enable one or more components required for transmitting the SR opportunity. For example, the DRX manager 406 may schedule the transmitter component 408 be "powered on" and in an active state during the prescribed SR transmit opportunity such that the transmitter component 408 can transmit the SR.

According to certain aspects, one exemplary power optimization technique is as follows: the SR manager 404 may allow a configurable amount of time (i.e. delay) to elapse after the arrival of new packet data before the UE transmits SR. As will be described in greater detail below, the SR manager 404 may select an SR opportunity that ensures performance parameters are met.

According to certain aspects, this timer may be referred to as $t_{SR}$, and for the following example, the value of $t_{SR}$ may be 20 msec. Additionally, for the foregoing example, the periodicity of the SR may be configured to be 10 msec. As such, for a given DRX cycle, the DRX manager may be informed of the time when the UE is to send SR and the DRX manager may plan accordingly.

Figure 5:
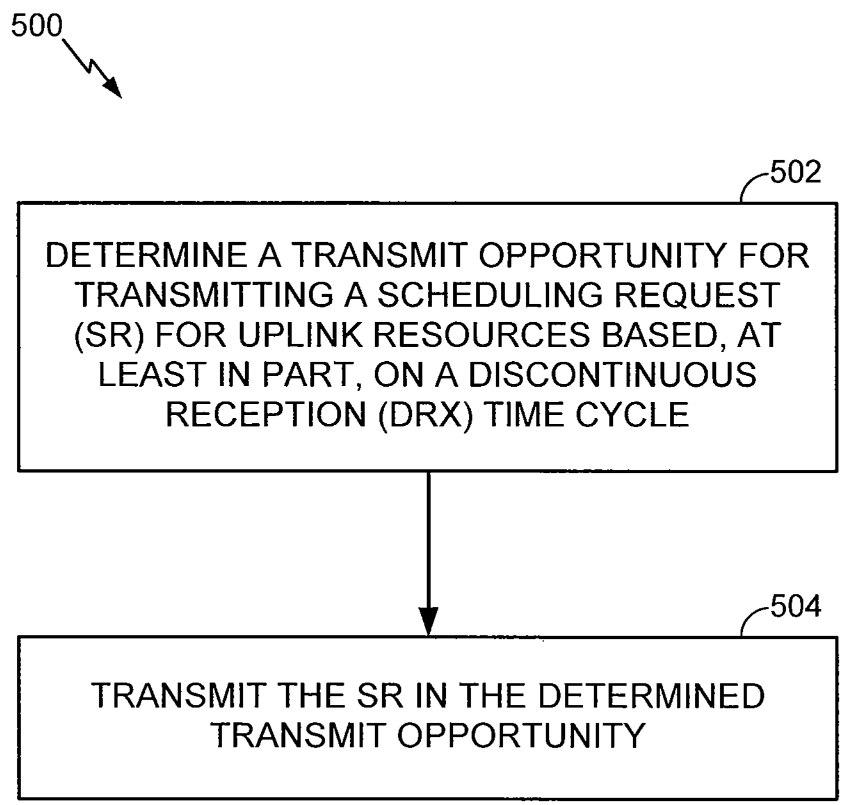
FIG. 5 illustrates an example operation that may be performed by a wireless device in accordance with certain aspects of the present disclosure.

FIG. 5 illustrates example operations 500 that may be performed by a UE for managing scheduling requests for power optimization in accordance with aspects of the present disclosure.

The operation 500 begin, at 502, with the UE determining a transmit opportunity (TX OP) for transmitting a scheduling request (SR) for uplink resources based, at least in part, on a discontinuous reception (DRX) time cycle. According to certain aspects, the transmit opportunity comprises a first transmit opportunity occurring after the DRX time cycle-provided the delay is not too great to affect application performance.

The method 500 continues at 504, where the UE transmits the SR in the determined transmit opportunity. According to certain aspects, the UE may skip one or more SR transmit opportunities that occur during the DRX time cycle. According to certain aspects, the UE may modify a DRX process based on the determined transmit opportunity. For example, the UE may modify the DRX process to turn on one or more components for transmitting the SR.

According to certain aspects, the UE may determine the transmit opportunity based on, at least in part, on an SR delay parameter. The SR delay parameter may be determined based on a number of factors, including but not limited to, a length of the DRX time cycle and channel conditions. According to certain aspects, the SR delay parameter may be configurable and set to a first delay value if channel conditions are "good" and to a second delay value if channel conditions are "bad."

In one specific implementation, the first delay value may be 20 msec and the second delay value may be 5 msec. These values may be selected, generally, based on the delay requirement for voice communications over the wireless communications. For example, it may be pre-determined that SR delay may not exceed more than 50-60 msec. One example of how the configurable SR delay parameter is used may be explained with reference to FIGS. 6 and 7.

Figure 6:
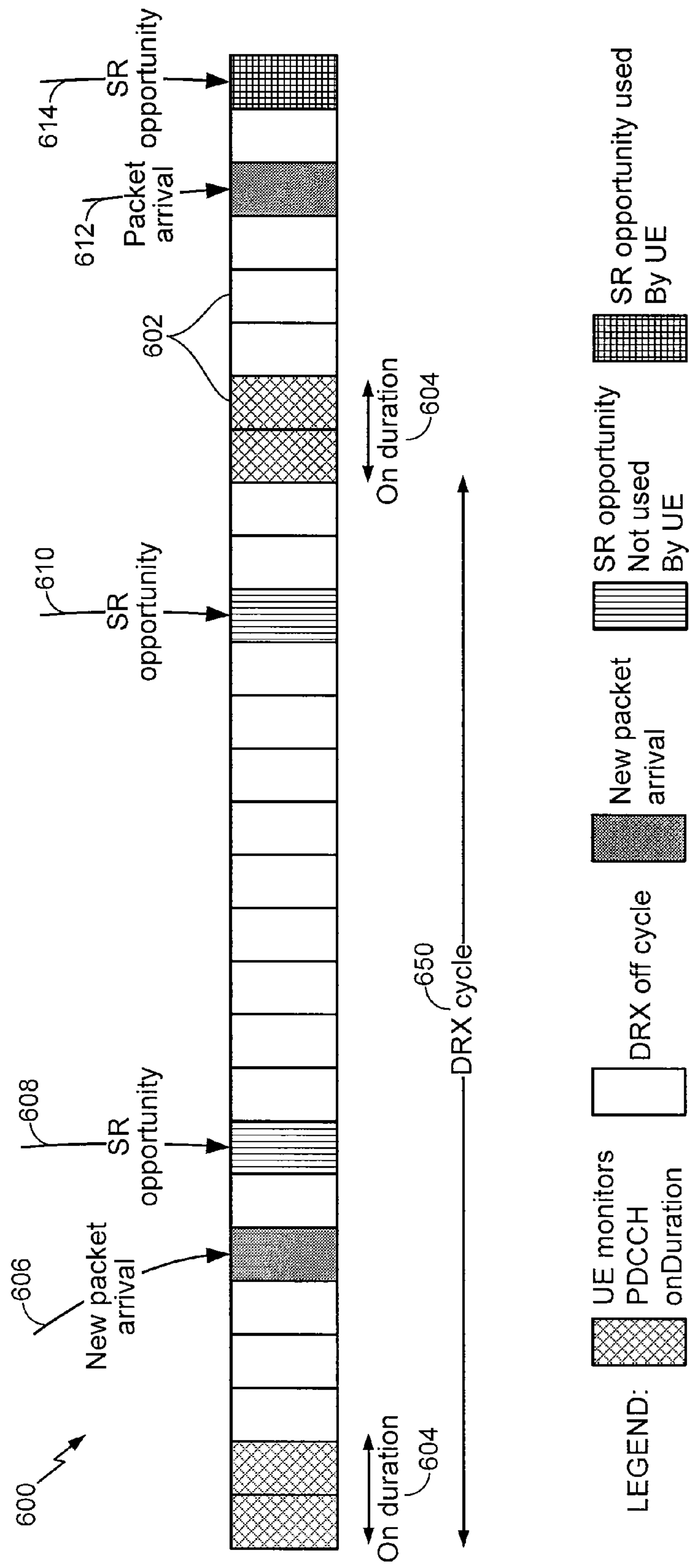
FIG. 6 illustrates an example of scheduling request (SR) transmit opportunities relative to a DRX cycle and optimized selection thereof, in accordance with certain aspects of the present disclosure.

FIG. 6 is an illustration of a time frame 600 depicting an example of scheduling request timing with discontinuous reception enabled, in accordance with certain aspects of the present disclosure. As with FIG. 3, the time frame 600 as depicted comprises a plurality of transmit time intervals 302 (TTIs). According to certain aspects, FIG. 6 illustrates an example of how SR scheduling delays sending SR until the end of the current DRX cycle according to certain aspects.

As shown, and similar to as described with regards to the FIG. 3, the UE may utilize a power saving DRX scheme comprising a periodic DRX cycle 650. As shown, the UE may be in an active state comprising active transmission and/or reception for a periodic duration of time 604 (e.g., on Duration period), wherein substantially all components of the UE may be powered on and are being utilized. In the aspect shown, the UE may monitor PDCCH for transmissions addressed to the UE. According to certain aspects, the UE may utilize a timer to track the on duration period 604, such as an on Duration timer.

An algorithm is herein provided according to certain aspects of the present disclosure for managing SR to optimize power consumption, particularly for Voice over IP communications that may have a delay requirement of approximately 50-60 msec. According to certain aspects, the SR manager 404 may provide one or more configurable parameters indicating a delay parameter. According to certain aspects, the SR manager 404 may provide two configurable parameters, referring herein as $t_{SR\_1}$ and $t_{SR\_2}$, corresponding to a delay for "good" and "bad" channel conditions, respectively. The "bad" channel condition delay parameter may be set at a duration of time less than the "good" channel condition to anticipate a longer transmission comprising one or more retransmissions and/or HARQs that may arise in a "bad" channel condition. In one particular implementation, the values for $t_{SR\_1}$ and $t_{SR\_2}$ are 20 msec and 5 msec, respectively. A "good" channel condition is described in further detail below.

As shown, upon receiving a new packet arrival 606, the SR manager 404 may calculate when to send the SR as follows (let the current time be $t_{current}$). According to certain aspects, the SR manager 404 may determine a first SR opportunity that occurs after a time after the appropriate delay parameter value (e.g., $t_{current}+t_{SR\_i}$, where i depends on the channel condition.) This time may herein be referred to as $t_{Send\_SR}$ (i.e., $t_{Send\_SR}=t_{current}+t_{SR\_i}$). Accordingly, the SR manager 404 may determine whether the $t_{Send\_SR}$ occurs after a delay threshold (i.e., $t_{Send\_SR}-t_{current}>t_{threshold}$) and if so, the SR manager 404 may select a previous SR opportunity to ensure SR is never delayed more than the threshold delay. According to one implementation, the delay threshold (i.e., $t_{threshold}$) may be set at 30 msec. According to certain aspects, the SR manager 404 may notify the DRX manager 406 of the next SR transmission time.

As shown in FIG. 6, the UE delays transmitting SR and skips the SR opportunities 608, 610 that occur during the DRX cycle 650. According to certain aspects, the UE determines the transmit opportunity as the SR opportunity 614 occurring after a delay parameter. As shown, the SR opportunity 614 occurs after the DRX cycle 650 has completed, thereby enabling the full power conservation benefit of the DRX cycle 650. Additionally, the UE may bundle any new data packets that may have arrived in the intervening period comprising the delayed SR transmission, for example, the packet arrival 612.

According to certain aspects, a "good" channel condition in VoIP communications may be defined based on a transport block size utilized in an adaptive multi-rate (AMR) codec. According to one implementation, for a 12.2 Kbps AMR codec, various physical resource block (RB) allocations may be utilized for one-packet and two-packet VoIP transmission. For a given transport block size index ($I_{TBS}$), there may be a corresponding transport block size (TBS) required to send one or two VoIP packets. For example, for an $I_{TBS}=7$, a TBS of 472 may be required for a 4 RB allocation. Based on empirical results, it has been determined that all rows with an $I_{TBS}\geq 17$ may support transmitting at least one VoIP packet with a single RB. Therefore, according to certain aspects, it may be safe to assume that even with packet bundling at least one packet may be transmitted upon receiving the allocation. Therefore, this region is characterized as "good channel" in accordance with certain aspects of the present disclosure. It is contemplated that certain aspects of the present disclosure may utilize other suitable transport block sizes, specifications, and/or other suitable definitions for characterizing a good or bad channel.

Figure 7:
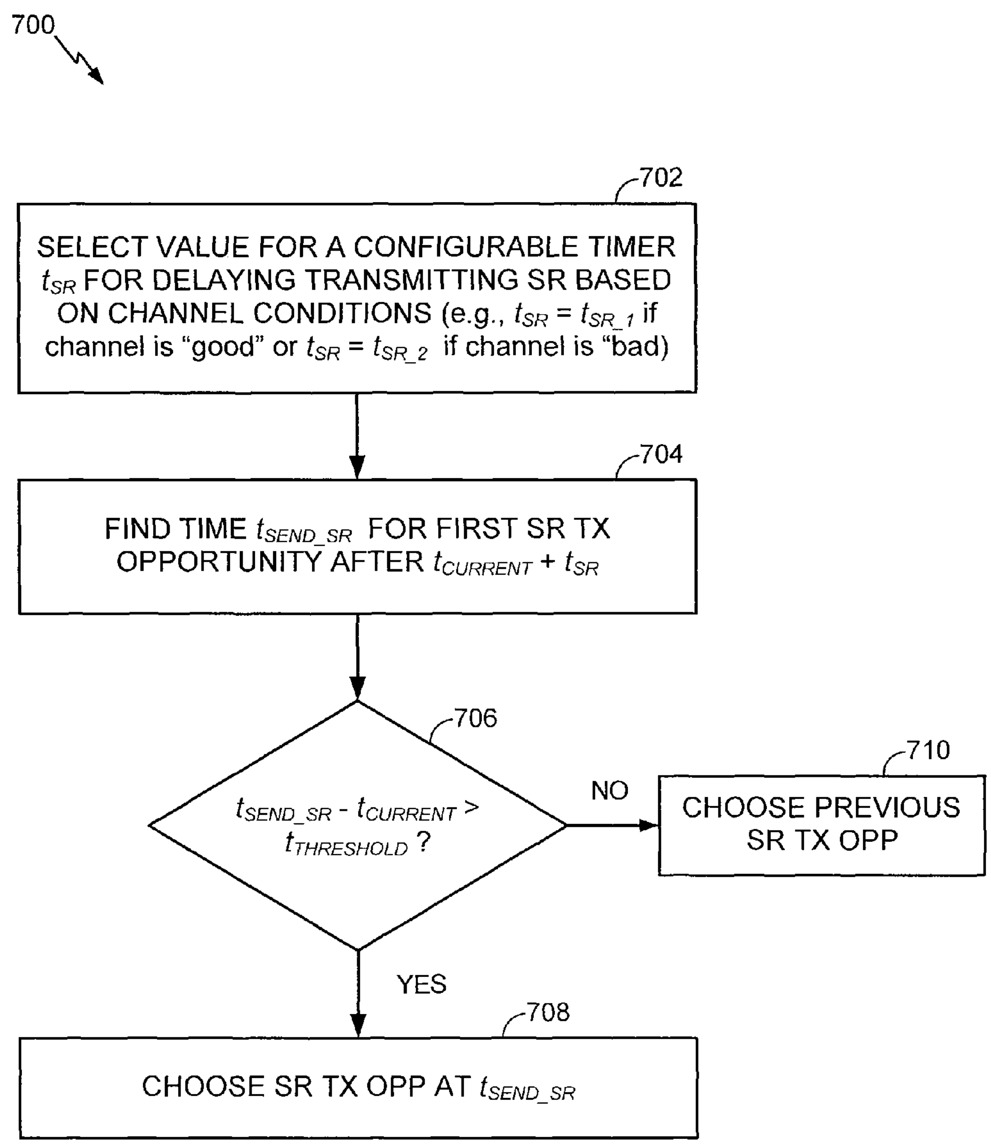
FIG. 7 illustrates example operations for selecting a SR transmit opportunity, in accordance with certain aspects of the present disclosure.

FIG. 7 illustrates example operations 700 for selecting a SR TX Opportunity based on DRX cycle length and channel conditions. In other words, the operations 700 may be considered as corresponding to the operation 502 shown in FIG. 5.

The operations begin, at 702, by selecting a value for a configurable timer ($t_{SR}$) for delaying transmission of SR, based on channel conditions. As described above, $t_{SR}$ may be set to a first value (e.g., $t_{SR\_1}=5$ ms) for good channel conditions or a second value (e.g., $t_{SR\_2}=20$ ms) for bad channel conditions.

At 704, the UE may find a time ($t_{SEND\_SR}$) for a first SR TX opportunity after the configurable delay period ($t_{CURRENT}+t_{SR}$).

The UE may then determine, at 706, whether that delay is within a threshold limit ($t_{SEND\_SR}-t_{CURRENT}>t_{THRESHOLD}$). For example, the threshold limit may be set to ensure that delay requirements are met (e.g., $t_{THRESHOLD}=30$ ms).

If the SR TX Opportunity delay is within the threshold limit (and delay performance parameters are satisfied), then the SR TX Opportunity occurring after the configurable delay is chosen, at 708. Referring back to FIG. 6, this may result in SR TX Opportunity 614 being selected, allowing the full DRX off cycle to be maintained, with full power savings.

If the SR TX Opportunity delay is not within the threshold limit (and delay performance parameters are not satisfied), then the UE may choose a previous SR TX Opportunity, at 710. Referring back to FIG. 6, this may result in SR TX Opportunity 608 or 610 being selected, meaning the UE may have to exit DRX prematurely in order to satisfy delay requirements.

Certain aspects of the present disclosure provide methods and apparatuses for managing scheduling requests during power optimization schemes. As described above, certain aspects of the present disclosure advantageously provides dynamic scheduling that co-exists with a power-saving scheme such as DRX and/or DTX. Without the techniques described herein, the UE may constantly wake up in the middle of a given DRX off cycles in order to transmit SR, which significantly increases VoIP LTE power consumption.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting and/or means for skipping may comprise a transmitter, such as the transmitter unit 254 of the receiver system 250 (e.g., the wireless terminal) shown in FIG. 2, or means for determining and/or means for modifying may comprise a processing system, which may include one or more processors, such as the processor 270 of the receiver system 250 illustrated in FIG. 2. These means may also comprise any suitable combination of the processor component 402, the SR manager 404, the DRX manager 406, the transmitter component 408, and/or the receiver component 410 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications by a user equipment (UE), comprising:

selecting a scheduling request (SR) delay based, at least in part, on a length of a discontinuous reception (DRX) time cycle and a channel condition;

determining a transmission delay comprising a time interval to a first SR transmit opportunity for transmitting an SR for uplink resources that occurs after the SR delay;

selecting an SR transmit opportunity based on a comparison of the transmission delay and a delay threshold; and transmitting the SR in the selected SR transmit opportunity.

2. The method of claim 1, wherein a length of the SR delay comprises at least a length until an end of an off duration period of the DRX time cycle.

3. The method of claim 1, wherein the first delay value is 20 msec and the second delay value is 5 msec.

4. The method of claim 1, wherein the delay threshold comprises a time value determined based, at least in part, on a general delay requirement for voice communications over the wireless communications.

5. The method of claim 1, further comprising:

modifying a DRX process based on the selected SR transmit opportunity.

6. The method of claim 1, further comprising:

determining that the UE has a data packet to send, wherein the selecting of the SR delay is in response to the determination.

7. The method of claim 1, wherein the first SR transmit opportunity is selected if the determined transmission delay does not exceed the delay threshold.

8. An apparatus for wireless communication by a user equipment (UE), comprising:

means for selecting a scheduling request (SR) delay based, at least in part, on a length of a discontinuous reception (DRX) time cycle and a channel condition, wherein the SR delay comprises a first delay value corresponding to a good channel condition or a second delay value corresponding to a bad channel condition;

means for determining a transmission delay comprising a time interval to a first SR transmit opportunity for transmitting an SR for uplink resources that occurs after the SR delay;

means for selecting an SR transmit opportunity based on a comparison of the transmission delay and a delay threshold, wherein a transmit opportunity that occurs prior to the first SR transmit opportunity is selected if the transmission delay exceeds the delay threshold; and means for transmitting the SR in the selected SR transmit opportunity.

9. The apparatus of claim 8, wherein a length of the SR delay comprises at least a length until an end of an off duration period of the DRX time cycle.

10. The apparatus of claim 8, wherein the first delay value is 20 msec and the second delay value is 5 msec.

11. The apparatus of claim 8, wherein the delay threshold comprises a time value determined based, at least in part, on a general delay requirement for voice communications over the wireless communications.

12. The apparatus of claim 8, further comprising:

means for modifying a DRX process based on the selected SR transmit opportunity.

13. The apparatus of claim 8, further comprising:

means for determining that the UE has a data packet to send, wherein the selecting of the SR delay is in response to the determination.

14. The apparatus of claim 8, wherein the first SR transmit opportunity is selected if the determined transmission delay does not exceed the delay threshold.

15. A non-transitory computer-readable medium having computer executable code stored thereon that, when executed by at least one processor, causes the at least one processor to:

select a scheduling request (SR) delay based, at least in part, on a length of a discontinuous reception (DRX) time cycle and a channel condition, wherein the SR delay comprises a first delay value corresponding to a good channel condition or a second delay value corresponding to a bad channel condition;

determine a transmission delay comprising a time interval to a first SR transmit opportunity for transmitting an SR for uplink resources that occurs after the SR delay;

select an SR transmit opportunity based on a comparison of the transmission delay and a delay threshold, wherein a transmit opportunity that occurs prior to the first SR transmit opportunity is selected if the transmission delay exceeds the delay threshold; and transmit the SR in the selected SR transmit opportunity.

16. An apparatus for wireless communication by a user equipment (UE), comprising:

at least one processor; and a memory coupled to the at least one processor, wherein the at least one processor is configured to:

select a scheduling request (SR) delay based, at least in part, on a length of a discontinuous reception (DRX) time cycle and a channel condition, wherein the SR delay comprises a first delay value corresponding to a good channel condition or a second delay value corresponding to a bad channel condition;

determine a transmission delay comprising a time interval to a first SR transmit opportunity for transmitting an SR for uplink resources that occurs after the SR delay;

select an SR transmit opportunity based on a comparison of the transmission delay and a delay threshold, wherein a transmit opportunity that occurs prior to the first SR transmit opportunity is selected if the transmission delay exceeds the delay threshold; and transmit the SR in the selected SR transmit opportunity.

* * * * *